United States Patent [19]

Chenevard et al.

[11] Patent Number: 5,060,783
[45] Date of Patent: Oct. 29, 1991

[54] PROCESS AND APPARATUS FOR ALIGNING ARTICLES OR ROWS OF ARTICLES

[75] Inventors: Alexis Chenevard, Morges; Hans Pilar, Pully, both of Switzerland

[73] Assignee: Sapal Societe Anonyme des Plieuses Automatiques, Ecublens, Switzerland

[21] Appl. No.: 192,924

[22] Filed: May 12, 1988

[30] Foreign Application Priority Data

May 12, 1987 [FR] France .................. 87 06759

[51] Int. Cl.⁵ ............................................. B65G 47/26
[52] U.S. Cl. .............................. 198/434; 198/468.1; 198/460
[58] Field of Search ............... 198/429, 430, 418.7, 198/434, 459, 460, 419.2, 468.9, 468.1, 740, 418.2, 418.5, 426, 461, 464.2, 572, 574, 576, 577, 578, 579, 857; 414/749

[56] References Cited

U.S. PATENT DOCUMENTS

| | | | |
|---|---|---|---|
| 1,932,301 | 10/1933 | Bowman et al. | 198/740 |
| 3,429,416 | 2/1969 | Provost et al. | 198/461 X |
| 3,662,871 | 5/1972 | Koepnick et al. | 198/460 X |
| 4,219,112 | 8/1980 | Loewenthal | 198/740 X |
| 4,296,590 | 10/1981 | Focke | 198/419.1 X |
| 4,611,705 | 9/1986 | Fluck | 198/426 X |

FOREIGN PATENT DOCUMENTS

| | | | |
|---|---|---|---|
| 1287503 | 1/1969 | Fed. Rep. of Germany | 198/459 |
| 2240876 | 3/1976 | France . | |
| 2003441 | 3/1979 | United Kingdom . | |
| 2069958 | 9/1981 | United Kingdom . | |

Primary Examiner—Joseph E. Valenza
Assistant Examiner—Cheryl L. Gastineau
Attorney, Agent, or Firm—Sandler, Greenblum & Bernstein

[57] ABSTRACT

Process and apparatus for aligning articles or rows of articles positioned irregularly on a conveyor along a predetermined path downstream of a conditioning line or the like, including at least one detector to detect the passage of the trailing article or row of articles. At least one alignment element is provided, and a respective activation device for each of the alignment elements, whereby the detector is adapted to transmit to the activation device a detection signal upon detecting the passage of the trailing product or row of products, and whereby the activation device is adapted to displace the alignment element from an initial rest position beyond the path of the article or row of articles on the conveyor, to an active position abutting against the trailing article or row of articles. The activation device is adapted to then displace the alignment element in the direction of movement of the conveyor at a substantially constant velocity greater than that of the conveyor, in a manner so as to push the article or row of articles positioned on the conveyor over a predetermined distance, and then to return the alignment element to the initial rest position. Various cycles of operation are also disclosed.

5 Claims, 3 Drawing Sheets

PROCESS AND APPARATUS FOR ALIGNING ARTICLES OR ROWS OF ARTICLES

BACKGROUND OF THE INVENTION

1. Field of the Invention

The present invention relates to an apparatus for aligning articles or rows of articles which are supplied irregularly on a conveyor belt from a conditioning line or the like, to or from a workstation, for example. This apparatus includes at least one detector for detecting the passage of the line or row of articles; at least one alignment element; and an activation device for the alignment element.

2. Description of Background and Relevant Information

Articles or rows of articles such as, for example, bars of chocolate or other products, food products or otherwise, manufactured by production machines such as, for example, molding devices, coating devices, extruders, cooling ovens, etc., are generally transported towards workstations on conveyor belts, ribbons, or other types of conveyors. During production, for example by means of one of the aforementioned machines, or in the course of transport, these products can undergo disturbances which misalign them or cause their path on the conveyor to be irregular. The proper operation of a packaging machine, e.g., requires a regular supply of products which must be properly arranged and aligned. In other words, it is indispensable that the products of each row be aligned and the rows to be properly spaced.

Numerous alignment and arrangement techniques have previously been proposed. For rates of up to 100 rows per minute the products can be retained by stopping them momentarily by means of abutments while the conveyor continues to move. Another technique currently utilized consists of positioning the products on a chain drive with protruding pins which brings the products to abut against the pins mounted on the chain at equal distances from one another. These relatively complicated mechanisms do not lend themselves to the treatment of all types of products and cannot be utilized for increased rates of speed on the order of 200–250 rows per minute.

Products manufactured at these increased rates must necessarily be taken up by the conditioning line at least at the same rate to ensure manufacturing efficiency to avoid stopping the production machines during the course of production.

It is thus imperative to have technical apparatus available for aligning the products and which is reliable at increased rates of speed and is adapted to be utilized for relatively delicate and fragile products.

The present invention is intended to overcome the weaknesses of known systems and to find a solution to the problems of alignment of the products or the rows of products on conveyor.

SUMMARY OF THE INVENTION

Accordingly, it is an object of the present invention to provide an apparatus for aligning products or rows of products positioned irregularly on a conveyor along a predetermined path downstream of a conditioning line or the like, which includes at least one detector to detect the passage of the trailing product or row of products; at least one alignment element, and a respective activation device for each of the alignment elements. At least one detector is adapted to transmit to said activation device in detection signal upon detecting the passage of the trailing product or row of products, and the activation device is adapted to displace the alignment element from an initial rest position beyond the predetermined path of the product or row of products on the conveyor, to an active position abutting against the trailing product or row of products. The activation device is adapted to then displace the alignment element in the direction of movement of the conveyor at a substantially constant velocity greater than that of the conveyor, in a manner so as to push the product or row of products positioned on the conveyor over a predetermined distance, and then to return the alignment element to the initial rest position.

According to one aspect of the invention, a single detector is provided for detecting the passage of the trailing product or row of products, and a single alignment element and respective activation device therefor is also provided. The single detector is adapted to transmit to the single activation device a detection signal upon detecting the passage of the trailing product or row of products, and the single activation device is adapted to displace the single alignment element from an initial rest position, beyond the predetermined path of the product or row of products on the conveyor, to an active position abutting against the trailing product or row of products. The single activation device is adapted to then displace than alignment element in the direction of movement of the conveyor at a substantially constant velocity greater than that of the conveyor, in a manner so as to push the product or row of products positioned on the conveyor over a predetermined distance, and then to return the single alignment element to its initial rest position, the return to the initial rest position being performed at a velocity which is substantially constant over at least a portion of its movement.

According to a further aspect of the invention, the return to the initial rest position is performed at a variable velocity determined as a function of the arrival of a following product or row of products, detected by the single detector, in such a manner that the arrival of the alignment element in the rest position coincides substantially exactly with the transmission of than detection signal of the following product or row of following products.

According to a further aspect of the invention, a single activation device is adapted to displace a single alignment element according to the following operation cycle: a first oscillation phase during which the single alignment element is displaced from an initial rest position at zero velocity to an abutting position with the trailing product or row of products, its velocity being greater than the velocity of the product or row of products on the conveyor; a second phase of substantially constant velocity whereby the single alignment element is displaced substantially parallel to the conveyor, at a velocity greater than that of the conveyor, whereby the single alignment element abuts against the trailing product or row of products while pushing same relative to the conveyor; a third acceleration phase whereby the single alignment element is raised to no longer be in contact with the product or row of products; a fourth displacement phase of substantially constant velocity during which the single alignment element is displaced, over a portion of its path, in a direction substantially opposite to the direction of displacement of the conveyor; and a fifth deceleration phase during which the single alignment element is returned at a decreasing velocity to its initial rest position at zero velocity.

According to a still further aspect of the invention, during the fifth deceleration phase of the aforementioned operation cycle, the single alignment element is returned at a decreasing velocity until the value of substantially constant velocity of the second phase is reached in the starting position of the second phase.

According to a still further aspect of the invention, the single activation device is adapted to displace the single alignment element according to the following operation cycle: a first oscillation phase in during which the single alignment element is displaced from its initial rest position at zero velocity into an abutment position with the trailing product or row of products, its velocity being greater than the velocity of linear movement of the product or row of products on the conveyor; a second phase of substantially constant velocity, whereby the single alignment element is displaced substantially parallel to the conveyor at a velocity greater than that of the conveyor, whereby the single alignment element abuts against the trailing product or row of products while pushing same relative to the conveyor; a third acceleration phase, whereby the single alignment element is raised to no longer be in contact with the product or row of products; and a fourth deceleration phase during which the single alignment element is returned at a decreasing velocity until the value of substantially constant velocity of the second phase is reached, in the starting position of the second phase.

According to a still further aspect of the invention, a first detector and a second detector are provided to detect the passage of the trailing products or rows of products. First and second alignment elements and first and second activation devices, respectively, are also provided. The first detector is adapted to transmit to the first activation device a detection signal upon detecting the passage of a trailing first product or a first row of products, in which the first activation device is adapted to displace the first alignment element from an initial rest position situated beyond the path of the produce or row of products on the conveyor, to an active position abutting against the trailing product or row of products. The first alignment element is then displaced in the direction of movement of the conveyor at a substantially constant velocity greater than that of the conveyor, in a manner so as to push the product or row of products positioned on the conveyor over a predetermined distance. The first alignment element is then returned to its initial rest position, after which the second detector is adapted to transmit to the second activation device a detection signal upon detecting the passage of a trailing product or row of products following the first product or row of products, in which the second activation device is adapted to displace a respective second alignment element from an initial rest position, beyond the path of the product or row of products, on the conveyor, to an active position abutting against the trailing product or row of products. The second alignment element is then displaced in the direction of the conveyor at a substantially constant velocity greater than that of the conveyor, in a manner so as to push the products or row of products positioned on the conveyor over a predetermined distance. The second alignment element is then returned to its initial rest position.

The apparatus for repositioning articles or rows of articles irregularly positioned on a conveyor moving at a predetermined velocity along a conveyor according to the present invention includes:

a device for detecting the passage of a trailing article or trailing article or articles of a row of articles and for generating a detection signal in response to detecting such passage;

a device for repositioning the trailing article or trailing article or articles of the row of articles;

a device for moving the device for repositioning, in response to generation of the detection signal, from (1) an initial position, to (2) an active position abutting the trailing article or trailing article or articles of a row of articles and moving the trailing article or articles at a substantially constant velocity greater than the predetermined velocity of the conveyor, and back to (3) the initial position.

According to a further aspect of the invention, the device for moving the device for repositioning is adapted to move the device for repositioning from an initial rest position beyond the predetermined path at zero velocity.

According to a further aspect of the invention, the device for repositioning is adapted to move in a closed path by the device for moving.

According to a particular embodiment of the invention, the device for repositioning includes at least one alignment element and the device for moving the device for repositioning includes a mechanism for moving the alignment element which includes: a drive motor; a cam having an outer contour, the cam being driven by the drive motor around an axis fixed relative to the drive motor; a crank having a first end and a second end, the crank being driven by the drive motor around an axis, fixed relative to the drive motor, located in the first end; an arm having a first end connected to the alignment element and having a second end, the second end of the crank being connected to the arm between the first end and the second end of the arm; an elbow having a first end pivotally connected to the second end of the arm and having a second end; and a cam follower connected to the second end of the elbow in operative association with the cam.

The present invention also includes a process for using the aforementioned apparatus including the steps of: accelerating the device for repositioning from the initial position beyond the predetermined path of the articles to an active position abutting the trailing article or trailing article or articles of a row of articles; moving the article or articles of a row of articles with the device for repositioning at a substantially constant velocity greater than the predetermined velocity of the conveyor; and moving the device for repositioning to a predetermined position.

According to a further aspect of the invention, the step of moving the device for repositioning to a predetermined position includes accelerating the device for repositioning from the active abutting position to a position out of contact with the articles; moving the device for repositioning at a substantially constant velocity in a direction substantially opposite to the predetermined direction of the conveyor; and decelerating the device for repositioning to the initial position, e.g., at zero velocity.

According to a still further aspect of the invention, the step of moving the device for repositioning to a predetermined position includes accelerating the device for repositioning from the active abutting position to a position out of contact with the articles; moving the device for repositioning at a substantially constant velocity in a direction substantially opposite to the predetermined direction of the conveyor; and decelerating the device for repositioning to a substantially constant velocity greater than the predetermined velocity of the conveyor.

According to a still further aspect of the invention, the step of moving the device for repositioning to a predetermined position includes: accelerating the device for repositioning from the active abutting position to a position out of contact with the articles; moving the device for repositioning at a decreasing velocity in a direction substantially opposite to the predetermined direction of the conveyor until the constant velocity greater than the predetermined velocity of the conveyor is reached.

BRIEF DESCRIPTION OF THE DRAWINGS

The invention will now be described with reference to the annexed drawings, given by way of non-limiting example only, in which.

DESCRIPTION OF PREFERRED EMBODIMENTS

In the apparatus according to the invention a detector is adapted to transmit to the activation device a detection signal when it detects the passage of the trailing product or row of products. The activation device is adapted to displace the alignment element from a rest position beyond the path of the product or row of products on the conveyor belt, e.g., into an active position by which the alignment element abuts against the trailing product or row of products, after which the alignment element displaces the product or row of products in the direction of movement of the conveyor belt at a substantially constant velocity greater than that of the conveyor belt in a manner so as to push the product or row of products positioned on the conveyor belt over a predetermined distance. The displacement element is then returned to its initial rest position.

According to a first embodiment of the invention a single detector is provided to detect the passage of the trailing product or row of products. In this embodiment a single alignment element and an activation device for the alignment element are also provided. The detector is adapted to transmit to the activation device a detection signal when it detects the passage of the trailing product or row of products, after which the activation device is adapted to displace the alignment element from a rest position situated beyond the path of the product or row of products on the conveyor belt, into an active position resting against the trailing product or row of products. The alignment element then displaces the products in the direction of movement of the conveyor belt at a constant velocity greater than that of the conveyor belt, in the manner so as to push the product or row of products positioned on the conveyor belt over a predetermined distance. The displacement element is then returned to its initial rest position at a velocity which is substantially constant over at least a portion of its path.

According to a second embodiment of the invention the detector is adapted to transmit to the activation device a detection signal when it detects the passage of the trailing product or row of products, after which the activation device is adapted to displace the alignment element from a rest position situated beyond the path of the product or row of products on the conveyor belt, into an active position by which the alignment element abuts against that trailing product or row of products. The alignment element then displaces the product or row of products in the direction of movement of the conveyor belt at a constant velocity greater than that of the conveyor belt, in a manner so as to push the product or row of products positioned on the conveyor belt over a predetermined distance. The displacement element is then returned to its initial rest position at a variable velocity defined as a function of the arrival of the product or of the following row of products, detected by the detector, in a manner such that the arrival of the alignment element in the rest position coincides substantially exactly with the transmission of the detection signal of the following product or of the following row of products.

According to a third preferred embodiment of the invention, the activation device is adapted to displace the alignment element according to the following cycle of operation: a first oscillation phase during which the alignment element is displaced from its rest position at zero velocity into an abutment position with the trailing product or row of products, its velocity being greater than the velocity of linear movement of the product or row of products on the conveyor belt; a second phase of substantially constant velocity whereby the alignment element is displaced substantially parallel to the conveyor belt, at a velocity greater than that of the conveyor belt, whereby the alignment element abuts against the trailing product or row of products while pushing same with respect to the conveyor belt; a third acceleration phase whereby the alignment element is raised to no longer be in contact with the product or row of products; a fourth displacement phase during which the alignment element is displaced it constant velocity, for a portion of its path, in a direction opposite to the direction of displacement of the conveyor belt; and a fifth deceleration phase, during which the alignment element is returned at a decreasing velocity, to its rest position, i.e., at zero velocity.

According to a fourth preferred embodiment of the invention, the activation device is adapted to displace the alignment element according to the following cycle of operation: a first oscillation phase during which the alignment element is displaced from its rest position at zero velocity into an abutment position with the trailing product or row of products, its velocity being greater than the velocity of linear movement of the product or row of products on the conveyor belt; a second phase of substantially constant velocity, whereby the alignment element is displaced substantially parallel to the conveyor belt, at a velocity greater than that of the conveyor belt, whereby the alignment element abuts against the trailing product or row of products while pushing same with respect to the conveyor belt; a third acceleration phase whereby the alignment element is raised to no longer be in contact with the product or row of products; a fourth displacement phase during which the alignment element is displaced at substantially constant velocity, for a portion of its path, in a direction opposite to the direction of displacement of the conveyor belt; and a fifth deceleration phase during which the alignment element is returned at a decreasing velocity until the value of substantially constant velocity of the second phase is reached, in the starting position of the second phase.

According to a fifth preferred embodiment of the invention, the activation device is adapted to displace the alignment element according to the following cycle of operation: a first oscillation phase during which the alignment element is displaced from its rest position at zero velocity into an abutment position with the trailing product or row of products, its velocity being greater than the velocity of linear movement of the product or row of products on the conveyor belt; a second phase of substantially constant velocity, whereby the alignment element is displaced substantially parallel to the conveyor belt, at a velocity greater than that of the conveyor belt whereby the alignment element abuts against the trailing product or row of products while pushing same with respect to the conveyor belt; a third acceleration phase, whereby the alignment element is raised to no longer be in contact with the product or row of products; and fourth deceleration phase during which the alignment element is returned at a decreasing velocity until the value of substantially constant velocity of the second phase is reached, in the starting position of the second phase.

A preferred embodiment of the apparatus of the invention includes a first and second detector for detecting the passage of the trailing products or row of products; a first and second alignment element, and a first and second activation device associated respectively with the two alignment elements. The first detector is adapted to transmit to the first activation device a detection signal when it detects the passage of the trailing first product or of the first row of products, the first activation device being adapted to displace the alignment element from a rest position situated beyond the path of the product or the row of products on the conveyor belt, to an active position abutting against the trailing product or row of products, then to displace the alignment element in the direction of the conveyor belt at a substantially constant velocity greater than that of the conveyor belt, in a manner so as to push the product or row of products positioned on the conveyor belt over a predetermined distance, and then to return the alignment element to its initial rest position. Upon the return of the first alignment element, the second detector is adapted to transmit to the second activation device a detection signal when it detects the passage of the trailing product of the next product or row of products following the first product or row of products, at which time the second activation device is adapted to displace a respective second alignment element from a rest position situated beyond the path of the product or row of products on the conveyor belt, to an active position abutting against the trailing product or row of products, then to displace the second alignment element in the direction of the conveyor belt, at a constant velocity greater than that of the conveyor belt, in a manner so as to push the product or row of products positioned on the conveyor belt over a predetermined distance, and then to return the second alignment element to its initial rest position.

Figure 1:
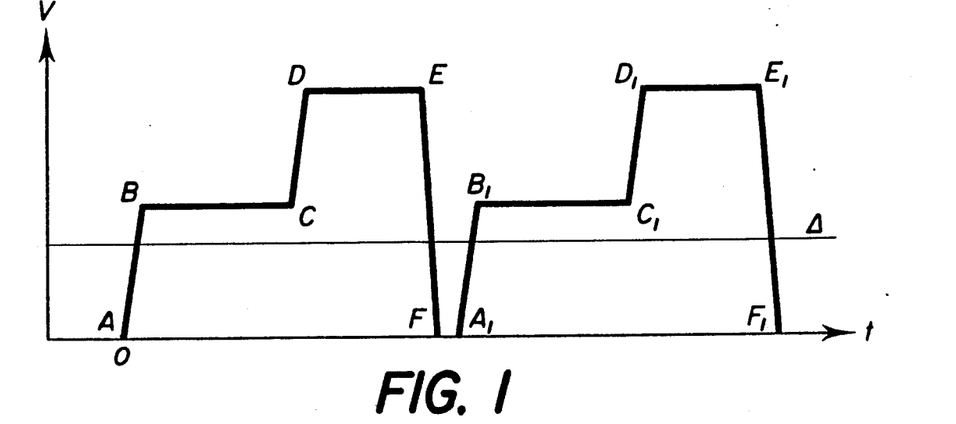
FIG. 1 illustrates a first mode of operation of the apparatus according to the invention.

FIG. 1 illustrates two complete cycles of operation of an alignment element according to one embodiment of the present invention. Time is shown as the abscissa and velocity as the ordinate. Point A of the diagram which constitutes the beginning of the cycle and corresponds to the moment when a detector, such as, for example, a photoelectric cell, detects the passage of that trailing product or row of products. Segment AB corresponds to the acceleration of the alignment element during which it catches up with the trailing products. Segment BC corresponds to the displacement of the alignment element at substantially constant velocity which velocity is greater than the velocity $\Delta$ of the conveyor belt which velocity is shown by the line substantially parallel to the axis of the abscissa. During its phase of displacement at substantially constant velocity, the alignment element pushes the product, the products of a row or at least one portion of these products which are positioned behind certain others of the row, at a velocity greater than that of the conveyor belt, which makes it possible to align them and to thereby put them into order. Point C corresponds to the p<,int of the cycle whereby the products are effectively aligned and whereby the alignment element is retracted such that it stops pushing the products. Segment CD corresponds to an acceleration of the alignment element. Segment DE, substantially parallel to the axis of the abscissa, corresponds to the return phase of the alignment element to its initial position. This return phase occurs at substantially constant velocity. Segment EF corresponds to the second phase of return of the alignment element to its initial position. It is a deceleration phase, during which the alignment element is brought into the space separating products or two rows of products.

Segment $FA_1$ corresponds to the waiting time before the next cycle of operation of the alignment element. During this period of time, which is normally relatively short, the alignment element is at rest. When the alignment apparatus operates according to cycles A-F and $A_1$-$F_1$ shown by FIG. 1, it begins from an initial stop position and returns to the initial stop position after an active phase of alignment of the products, which is performed in part at substantially constant velocity, and after a return, which is likewise performed at substantially constant velocity. In practice, the rows can succeed one another in a random fashion. It is necessary in principle that the alignment element be activated at the moment the detector detects the passage of the trailing product or row of products which are to be realigned. That is, it is necessary that the products be realigned do not arrive "too early," that is to say at a moment when the alignment element has not yet corrected its return movement. This return movement of the alignment element must occur before the arrival of the following row. However, this mode of operation can be somewhat modified by the addition of a memory adapted to store the detection signal of the passage of the trailing row, if detection occurs before the return of the alignment element, and by the addition of a control circuit adapted to control the alignment element such that it can catch up with the product or row of products in a sufficiently short period of time, so that realignment can still be performed on the section of the conveyor mechanism provided for this purpose.

Figure 2:
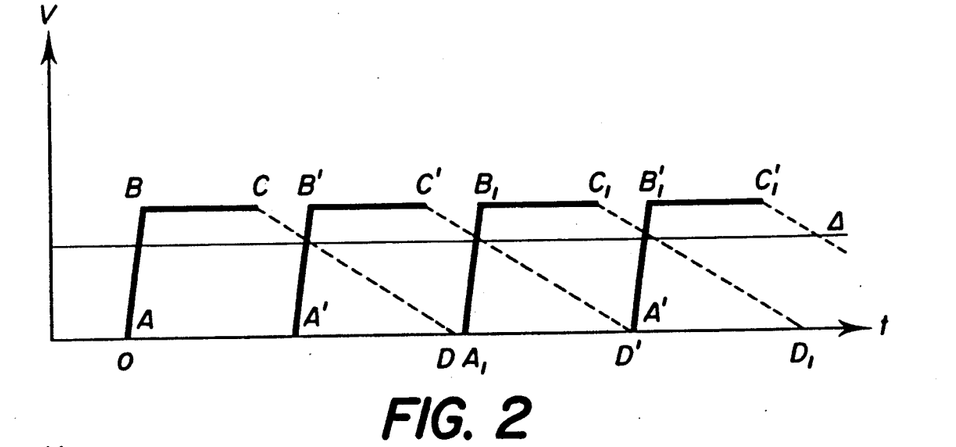
FIG. 2 illustrates a second mode of operation of the apparatus according to the invention.

FIG. 2 illustrates another mode of operation of the present invention for which the apparatus includes two alignment elements which are successively placed in operation. In this embodiment, the first alignment element is activated at zero time corresponding to point A, and is accelerated to a velocity greater than the velocity Δ of the conveyor belt shown by the line substantially parallel to the axis of the abscissa. The alignment phase itself corresponds to the segment BC whereby the alignment element is displaced at a substantially constant velocity while pushing the product or row of products. The return of the alignment element can be performed in any number of ways, provided that it is returned again to the rest position at the moment corresponding to point D. In effect, the product or following row of products is taken over by the second alignment element at the instant corresponding to point A'. This second alignment element is accelerated until point B' whereupon it fulfills its alignment function until point C'. Its return can be adapted such that it is located in its initial position at the moment represented by point D'. The following cycle is then performed by the first alignment element which starts at point $A_1$, passes through point $B_1$, point $C_1$, and then to point $D_1$. The subsequent cycle is performed by the second alignment element which starts at point $A'_1$, passes through point $B'_1$, point $C'_1$, and then to point $D'_1$ (not shown). In this case, the maximum speed can be higher than that of the preceding example. Theoretically it can be doubled. Furthermore, the demands made of the drive motor are less since the return of the alignment elements can be performed along a velocity curve which is free of sudden acceleration and deceleration. According to one embodiment, the apparatus includes an independent activation motor for each alignment element. According to another embodiment, the apparatus includes a single motor, the two alignment elements being offset by 180° in the cycle of operation.

Figure 3:
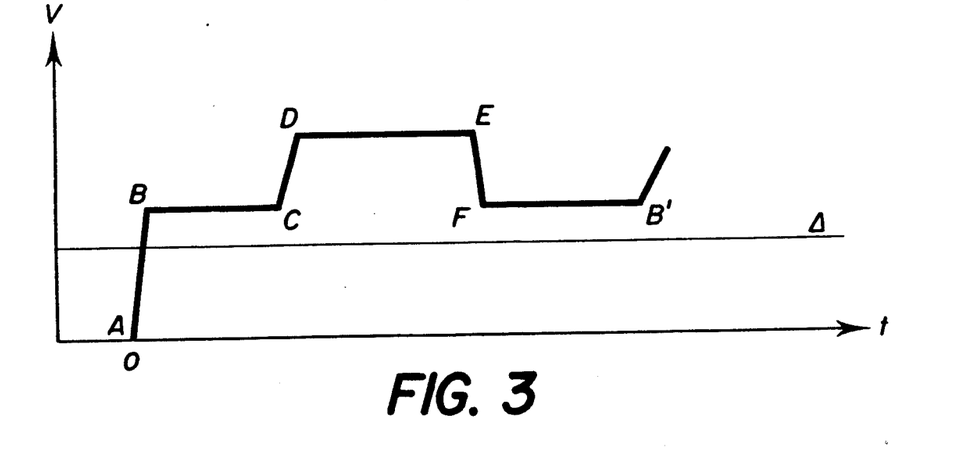
FIG. 3 illustrates a third mode of operation of the apparatus according to the invention.

FIG. 3 illustrates a third mode of operation of the present invention for which the apparatus includes only a single alignment element, as in the embodiment corresponding to FIG. 1. In this embodiment, the alignment element starting at zero time from its initial position shown by point A is accelerated to point B. The active phase of pushing the products on the conveyor belt occurs over segment BC as with the aforementioned embodiments at a substantially constant velocity greater than the velocity Δ of the conveyor belt, shown by the line substantially parallel to the axis of the abscissa. Segment CD represents a phase during which the alignment element is accelerated, and segment DE corresponds to a first phase of the return path of the alignment element wherein it is displaced at a substantially constant velocity. Segment EF corresponds to the second phase of the return of the alignment element. At point F the alignment element again comes into contact with the products and starts a new alignment cycle FB', etc. The alignment element does not again pass through stop and wait phase between the two alignment cycles, as in the case of the embodiment of FIG. 1.

An alternative embodiment can be obtained by modifying the trajectory CDEF partially or totally. It would be possible to displace the alignment element at a variable velocity between the points D and F, by eliminating the displacement phase having a substantially constant velocity during segment DE.

The advantage of this embodiment is that the strain on the motor is less since the alignment element no longer passes through a stop and wait phase. On the other hand, the regulation of the velocity is more complex.

Figure 4:
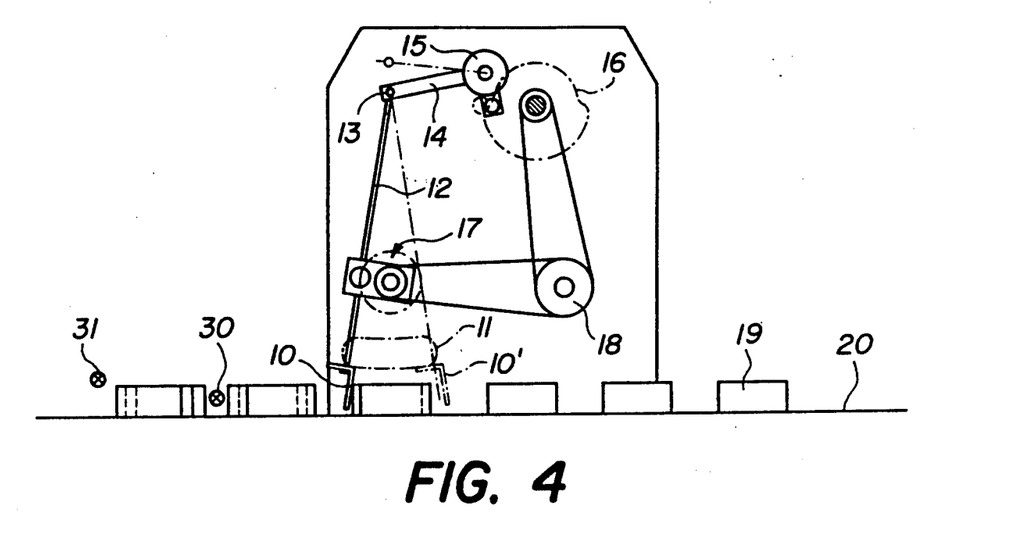
FIG. 4 illustrates an elevational view of one particular embodiment of the apparatus according to the invention.
Figure 5:
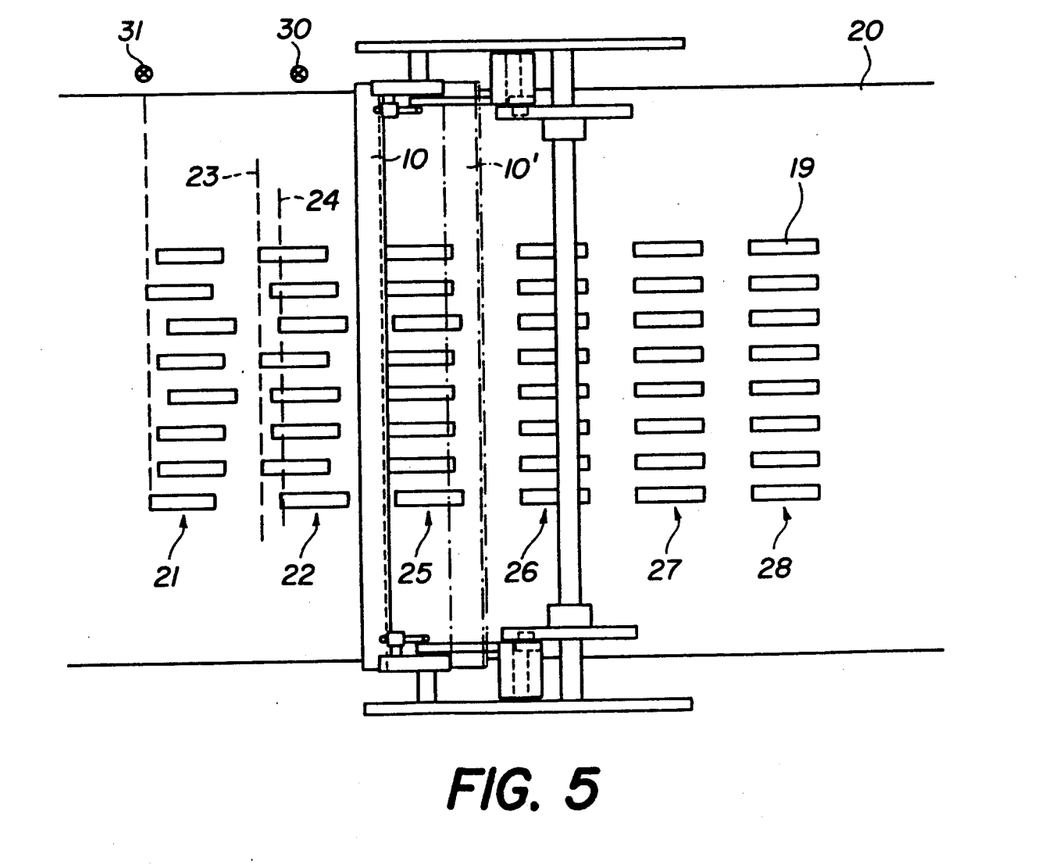
FIG. 5 is a top view of the apparatus illustrated in FIG. 4.

The apparatus shown in FIGS. 4 and 5 is adapted to operate in a mode corresponding to that of FIGS. 1 and 3. It comprises a single alignment element 10 shown in different positions adapted to follow a closed curve path 11. The alignment element is affixed to the end of an arm 12 journalled at 13 to the end of an elbow 14 carrying a roller 15 resting on the contour of a rotating cam 16. A crank and connecting rod mechanism 17 cooperates with the cam 16 and cam follower roller 15 to move alignment element 10 along path 11. A single drive motor 18 is coupled via respective drive belts, e.g., both to cam 16 and to the crank and connecting rod mechanism 17. This extremely light mechanism, consequently having a low inertia, is particularly well-adapted to allow for the realignment of the products or rows of products 19 at very high rates.

As shown more particularly in FIG. 5, the products arrive on the conveyor belt 20 in the form of a row 21 in which the individual products are misaligned with respect to one another. The purpose of the alignment operation is to bring the products which are rearmost, for example, those of row 22 which are adjacent the imaginary line 23, into alignment with respect to the products of this same row which are frontmost, i.e., those which are adjacent imaginary line 24. This alignment occurs by virtue of alignment element 10 which functions to push the most rearward products which define the most rearward portion of the row, in alignment with the trailing products which are most forward.

In practice, the manipulation includes two phases: a first phase during which the products which are most rearward catch up with the products which are most forward, and a second phase during which all of the products are pushed at a velocity greater than that of the conveyor belt to bring the entire row into a predetermined position with respect to the preceding row. In FIG. 5, row 25 is shown in the process of being aligned by alignment element 10. The position of the alignment element when the alignment phase is ended is depicted by 10', shown in phantom, which corresponds to point C of FIGS. 1-3. Rows which are aligned and put in proper order are depicted as 26, 27, and 28.

During an operation performed according to the techniques described with reference to FIGS. 1 and 3, the apparatus comprises a detector 30, for example a photoelectric cell, whose function is to detect the trailing products.

During an operation performed according to the embodiment described in FIG. 2, a second detector 31 is necessary to detect the position of the product or of the following row of products.

Figure 6:
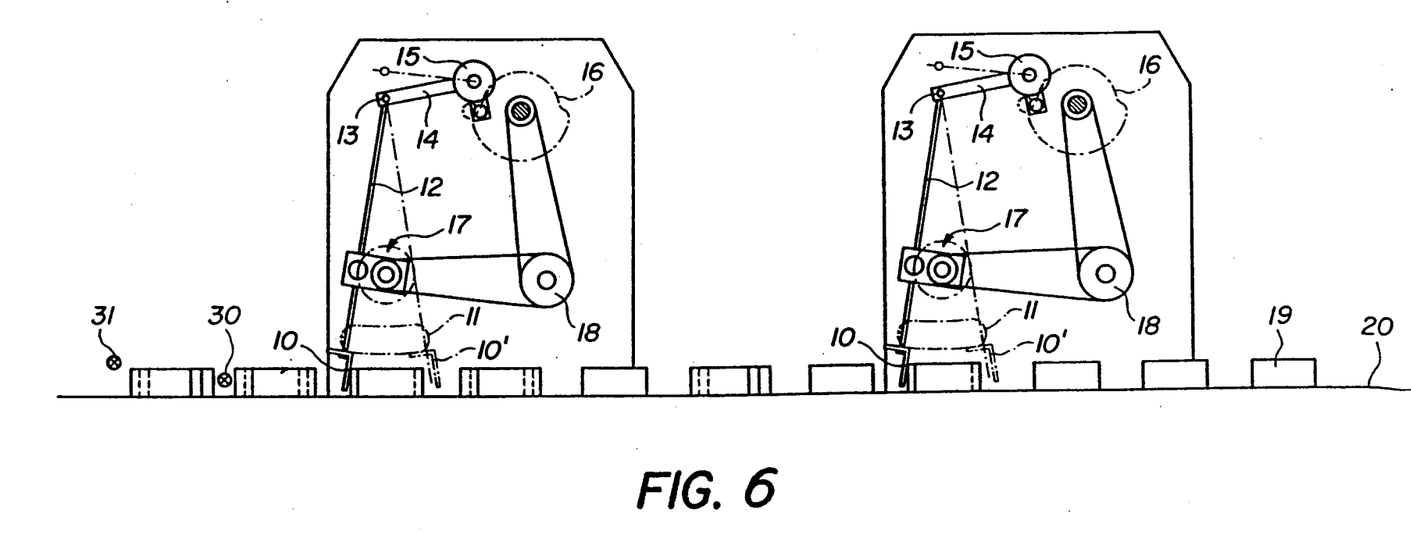
FIG. 6 illustrates an elevational view of an embodiment of the apparatus for performing the second mode of operation illustrated in FIG. 2.

The operation illustrated by FIG. 2 necessitates the use of two alignment elements which can be connected to one another or which are independent, as mentioned above. In the latter case, each of the two alignment elements is separately moved by a mechanism of the type shown by FIGS. 4 and 5. In such an as illustrated in FIG. 6, embodiment, the two alignment elements 32, 33 can be positioned adjacent each other in the direction of movement of the conveyor belt and can operate, e.g., on alternate rows of products. In FIG. 6 the various parts of the respective alignment elements 32, 33 are the same and, thus, are represented by the same reference numerals utilized in connection with FIGS. 4 and 5.

The present invention is not limited to the embodiments described but can undergo various modifications and assume different variations which are evident to one of ordinary skill in the art. In particular, the drive mechanism of the alignment element can be replaced by any other appropriate mechanism. It is appropriate, however, to provide a mechanism which can adapt itself to very rapid rates of movement of the products on the conveyor belt, which results in a light weight construction having a low inertia.

Finally, although the invention has been described with reference to particular means, materials, and embodiments, it is to be understood that the invention is not limited to the particulars disclosed and extends to all equivalents within the scope of the claims.

We claim:

1. Apparatus for aligning products or rows of products positioned irregularly on a conveyor along a predetermined path, comprising a first detector and a second detector for detecting passage of trailing products of a row of products or rows of products, a first alignment element and a second alignment element, and first activation means and second activation means associated, respectively, with said first alignment element and said second alignment element, said first detector being adapted to transmit to said first activation means a detection signal upon detecting passage of a first trailing product or a first row of products, said first activation means comprising means for displacing said first alignment element from an initial rest position situated beyond the path of said products or rows of products on said conveyor, to an active position abutting against said first trailing product or first row of products, and then for displacing said fist alignment element in the direction of movement of said conveyor at a substantially constant velocity greater than a velocity of said conveyor, in a manner so as to push said first trailing product or first row of products positioned on said conveyor over a predetermined distance, and then for returning said first alignment element to said initial rest position, said second detector being adapted to transmit to said second activation means a detection signal upon detecting the passage of a second trailing product or second row of products following said first product or first row of products, said second activation means comprising means for displacing said second alignment element from an initial rest position beyond said predetermined path of said products or rows of products on said conveyor, to an active position abutting against said second trailing product or second row of products, then for displacing said second alignment element in the direction of said conveyor at a substantially constant velocity greater than that of said conveyor, in a manner so as to push said second trailing product or second row of products positioned on said conveyor over a predetermined distance, and then for returning said second alignment element to its initial rest position.

2. Apparatus for repositioning articles or rows of articles irregularly positioned on a conveyor moving at a predetermined velocity along a predetermined path comprising:

(a) means for detecting the passage of a trailing article or articles of a row of articles and for generating a detection signal in response to detecting said passage;

(b) means for repositioning said trailing article or articles of said row of articles;

(c) means for moving said means for repositioning, in response to generation of said detection signal from (1) an initial position, to (2) an active position abutting said trailing article or articles of a row of articles and moving said trailing article or articles at a substantially constant velocity greater than said predetermined velocity of said conveyor, and back to (3) said initial position, wherein said means for repositioning comprises at least one alignment element and wherein said means for moving said means for repositioning comprises means for moving said alignment element which comprises:

(i) a drive motor;
  (ii) a cam having an outer contour, said cam driven by said drive motor around an axis fixed relative to said drive motor;
  (iii) a crank having a first end and a second end, said crank driven by said drive motor around an axis, fixed relative to said drive motor, located in said first end;
  (iv) an arm having a first end connected to said alignment element, and said arm having a second end, said second end of said crank connected to said arm between said first end and said second end of said arm;
  (v) an elbow having a first end pivotally connected to said second end of said arm, and said elbow having a second end; and
  (vi) a cam follower connected to said second end of said elbow in operative association with said cam.

3. An apparatus for repositioning articles or was of articles irregularly positioned on a conveyor moving at a predetermined velocity along a predetermined path comprising:

(a) means for detecting the passage of a trailing article or articles of a row of articles and for generating a detection signal in response to detecting said passage;

(b) means for repositioning said trailing article or articles of said row of articles;

(c) means for moving said means for repositioning, in response to generation of said detection signal, from (1) an initial position to (2) an active position abutting said trailing article or articles of a row of articles and moving said trailing article or articles at a substantially constant velocity greater than said predetermined velocity of said conveyor, and back to (3) said initial position, wherein said means for repositioning comprises at least one alignment element and wherein said means for moving said means for repositioning comprises means for moving said alignment element which comprises a drive assembly having a single drive motor.

4. The apparatus of claim 3 wherein said drive assembly comprises an arm upon which said alignment element is mounted and a crank connected to said arm and driven in rotating by means of said single drive motor.

5. The apparatus of claim 4 wherein said drive assembly further comprises a cam driven in rotation by means of said single drive motor, wherein said arm is functionally associated with said cam.

* * * * *

UNITED STATES PATENT AND TRADEMARK OFFICE
CERTIFICATE OF CORRECTION

PATENT NO. : 5,060,783

DATED : October 29, 1991

INVENTOR(S) : Alexis CHENEVARD et al.

It is certified that error appears in the above-identified patent and that said Letters Patent is hereby corrected as shown below:

At column 2, line 2 of the printed patent, change "in" to ---a---.

At column 2, line 29 of the printed patent, change "than" to ---the---.

At column 2, line 45 of the printed patent, change "than" to ---the---.

At column 3, line 43 of the printed patent, change "produce" to ---product---.

At column 6, line 51 of the printed patent, change "it" to ---at---.

At column 8, line 27 of the printed patent, change "p<,int" to ---point---.

At column 10, line 61 of the printed patent, insert ---as illustrated in Fig. 6,--- after "case,".

At column 10, line 62 of the printed patent, insert ---32, 33--- after "elements".

At column 10, line 63 of the printed patent, delete "as illustrated in Fig. 6," after "an".

At column 10, lines 64 and 65 of the printed patent, change "32, 33 can be" to ---are---.

At column 11, line 37 (claim 1, line 18) of the printed patent, change "fist" to ---first---.

At column 12, line 36 (claim 3, line 1) of the printed patent, change "was" to ---rows---.

UNITED STATES PATENT AND TRADEMARK OFFICE
CERTIFICATE OF CORRECTION

PATENT NO. : 5,060,783
DATED : October 29, 1991
INVENTOR(S) : Alexis Chenevard, et. al.

It is certified that error appears in the above-indentified patent and that said Letters Patent is hereby corrected as shown below:

At column 12, line 62 (claim 4, line 4) of the printed patentm change "rotating" to ---rotation---.

Signed and Sealed this

Fifteenth Day of June, 1993

Attest:

MICHAEL K. KIRK

Attesting Officer

Acting Commissioner of Patents and Trademarks